United States Patent
Barrett et al.

(10) Patent No.: US 9,734,228 B2
(45) Date of Patent: Aug. 15, 2017

(54) DIGITAL ANALYTICS SYSTEM

(75) Inventors: Leonidas Michael Barrett, Hoboken, NJ (US); Tzuu-Wang Shein, Jersey City, NJ (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 285 days.

(21) Appl. No.: 13/280,782

(22) Filed: Oct. 25, 2011

(65) Prior Publication Data

US 2012/0102053 A1    Apr. 26, 2012

Related U.S. Application Data

(60) Provisional application No. 61/406,764, filed on Oct. 26, 2010.

(51) Int. Cl.
G06F 17/30    (2006.01)
(52) U.S. Cl.
CPC .............................. *G06F 17/30592* (2013.01)
(58) Field of Classification Search
CPC ................................................ G06F 17/30592
USPC .................................................. 707/754, 792
See application file for complete search history.

(56) References Cited

U.S. PATENT DOCUMENTS 6,151,601 A    11/2000 Papierniak et al.
7,912,701 B1 *    3/2011 Gray et al. ........................ 704/9
2006/0238919 A1 *    10/2006 Bradley ........................ 360/128
2008/0052102 A1 *    2/2008 Taneja et al. ...................... 705/1
2009/0307052 A1 *    12/2009 Mankani et al. ............... 705/10
2010/0082691 A1 *    4/2010 Jaster et al. .................. 707/792
2011/0009991 A1 *    1/2011 Dinicola et al. ................ 700/97

FOREIGN PATENT DOCUMENTS

WO    00/42553 A2    7/2000

OTHER PUBLICATIONS

"Search Report on Canadian Patent Application CA 2756198", Canadian Intellectual Property Office, dated Nov. 26, 2013.
"Search Report on Canadian Patent Application CA 2756198", Canadian Intellectual Property Office, dated Mar. 16, 2015, 6 pages.

* cited by examiner

*Primary Examiner* — Mark D Featherstone
*Assistant Examiner* — Navneet Gmahl
(74) *Attorney, Agent, or Firm* — Mannava & Kang, P.C.

(57) ABSTRACT

A digital analytics system comprises a data management system including data extraction modules and a data storage system. The data extraction modules extract data from data sources and store the data in storage units. An analytics engine system including analytics engines and interfaces to retrieve data relevant to the analytics engines from the storage units. The analytics engines may perform prescriptive or descriptive analytics on the retrieved data. An applications interface and storage stores applications. The applications may be executed using information generated by the prescriptive or descriptive analytics performed by the analytics engines.

14 Claims, 5 Drawing Sheets

DIGITAL ANALYTICS SYSTEM

PRIORITY

The present application claims priority to U.S. provisional patent application Ser. No. 61/406,764 filed Oct. 26, 2010, which is incorporated by reference in its entirety.

BACKGROUND

Many companies and other entities (generally companies) are re-evaluating how they make crucial business decisions. In order to make the best possible business decisions, companies desire to have the best possible information available. However, the availability and volume of data may pose a great barrier to these companies. For example, a company may need a third party's proprietary data that may not be publicly available. In another case, the amount of data available may be so large that it is difficult for the company to determine which data is even relevant to their business decisions. Furthermore, the company may not have the expertise to properly analyze the data. Moreover, the company may not know how to use the data to positively impact their business decisions.

SUMMARY OF THE INVENTION

According to an embodiment, a digital analytics system comprises a data management system, an analytics engine system and an applications interface and storage. The data management system may analyze, filter, modify and re-format data from data sources and store the data in storage units. Analytics engines perform analytics on the data. The applications interface and storage includes a plurality of applications, and the applications may be executed using information generated by performing the analytics on the data.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. Also, the embodiments may be used in combination with each other. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Also, the embodiments described herein may be used with each other in various combinations.

Analytics, or business data analysis, provide a company making a crucial business decision with an opportunity to improve performance by providing the best possible information relevant to the business decision to drive a high performance outcome. According to an embodiment, a system provides a variety of descriptive and/or predictive analytics for multiple clients based on the dynamic needs of the clients. Also, the system provides applications that may utilize data from the analytics to provide client-specific information. The system comprises hardware and software operable to provide the descriptive and/or predictive analytics. The system may provide analytics services and applications on-demand and as needed by the client so the client does not need to invest in internal systems to perform those functions. Furthermore, through the system, a multitude of different analytics may be available to the client.

Descriptive analytics may comprise analyzing historic data, which may include performance data, to provide a description of what happened for past events. Descriptive analytics may encompass identifying successes or failures, which may be based on key performance indicators for a given application. Descriptive analytics may include generating alerts, queries, ad hoc reports, standard reports, etc. that provide data and insight into a current issue surrounding a crucial decision. Predictive analytics may comprise estimating a probable future outcome of an event or a probability or likelihood of an event occurring given a set of circumstances. A predictive analytics engine may perform optimization, predictive modeling, forecasting/extrapolation, statistical analysis, etc. to predict an outcome. The predictions may be used to drive crucial business decisions or non-business related decisions that may depend on forecasting made available through predictive analytics.

The system may provide descriptive and/or predictive analytic solutions that are industry-specific, client-specific and/or problem-specific through applications. The system may operate as a service provider serving a variety of clients from a variety of industries. For example, the digital analytics platform may serve clients from the defense industry, the pharmaceutical industry, the construction industry, the banking industry, etc. Moreover, for each client, the system may provide a variety of descriptive and/or predictive analytic solutions for a variety of problems that may be encountered by the client. Furthermore, the system may also provide the variety of descriptive and/or predictive analytic solutions to a multitude of different clients simultaneously through applications.

Figure 1:
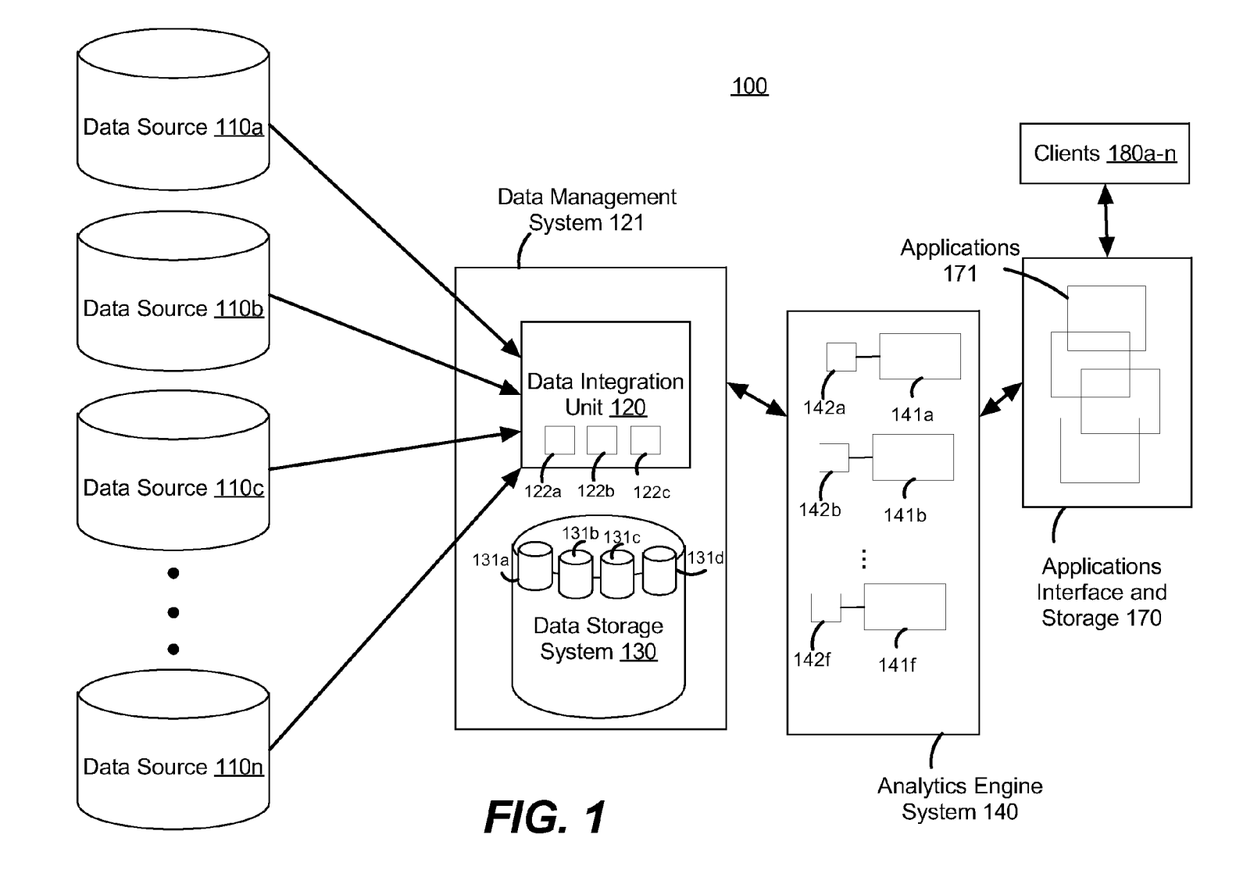
FIG. 1 illustrates a system diagram, according to an embodiment.

FIG. 1 illustrates a digital analytics system 100, according to an embodiment of the invention. The system 100 provides descriptive and/or predictive analytics for a multitude of clients 180a-n. A client is any user, company or other entity utilizing the system. The descriptive and/or predictive analytics provided to each of the clients 180a-n may be industry-specific and/or problem-specific.

The system 100 includes data management system 121, analytics engine system 140, and applications interface and storage system 170. Data sources 110a-n may include a variety of different sources providing data to the system 100. The data sources 110a-n may include public or private data sources and may include one or more of the clients 180a-n providing data to the system. The data sources 110a-n may provide data to the system 100 through real-time and/or batch processing, depending upon the data source.

The data provided by the data sources 110a-n to the system 100 may include any data used to provide descriptive and/or predictive analytic solutions to the clients 180a-n. The data may include publicly available data. For example, the publicly available data stored in the data sources 110*a-n* may include market data, news, financials, industry specific data, regulatory changes, weather implications, trends, etc. The data provided by the data sources 110*a-n* may also include privately managed data. For example, the privately managed data may include client business process data, customer data, supply chain operations data, enterprise resource planning (ERP) transactions, workforce data, product/service development data, financial data, service provide research data, industry data, etc. The data provided by the data sources 110*a-n* may also include emerging data. Examples of the emerging data include regional data, eco-political updates, trade/tariff changes, competitor implications, value chain insight (i.e. customer and vendor data), innovation data, pipeline future value data, product development effectiveness data, competitors' innovation progress data, social network outlets, buzz on reputation/brand, etc. Other types of data may also be provided.

The data provided by the data sources 110*a-n* may be structured or unstructured data. Unstructured data is computerized information that does not have a data model or is not usable by a computer program in its current format. For example, the unstructured data may include data from social networks and news blogs, web data, etc. Structured data, on the other hand, either has a data model (e.g., adheres to a particular schema) or is usable by a computer program in its current format. For example, consumer profiles, consumer addresses, and revenue information may be provided by the data sources 110*a-n* in a predetermined format. At the data management system 121, a data integration unit 120 receives the data from the data sources 110*a-n* and loads the data into the data storage system 130. The data integration unit 120 may pull the data or request the data to be pushed to the data management system 121.

The data integration unit 120 may comprise multiple extract, transform and load modules (ETLs). ETLs 122*a-c* are shown but the system may include more or less number of ETLs. The ETLs 122*a-c* store and execute business rules and translation rules. A translation rule specifies constraints or instructions to format data from the data sources 110*a-n*. This may include specifying a type of data format for the format conversion, a schema format including fields for the new schema, or any other type of data formatting. In one example, a data type format may include converting all monetary values to US dollars before storing monetary values in the data storage system 130. This translation rule may be dependent on a business rule and include a call to a business rule that specifies the ETL to retrieve a data exchange rate table from a data source and perform the conversion to US dollars according to exchange rates in the table. Other examples of data type formatting may include converting data from floating point values to integers, or formatting data to comprise a predetermined maximum number of characters, etc. Another type of translation rule may indicate that data received from a data source in a predetermined schema is to be stored in a different schema, which may have different fields. The ETL may map a field of the schema of the received data to a field of a schema for storing the data in the data storage system 130.

The business rules specify constraints or instructions that may be related to business intelligence. An example of a business rule in an ETL may include only accepting data from certain data sources. Another example may include that if the same or similar data is available from more than one source (e.g., weather data), use a prioritized list of data sources to accept data from the sources in the order specified in the list. The business rules may include instructions for analyzing and modifying the data according to the rules. The ETLs 122*a-c* may include rules for filtering. Filtering rules may identify a subset of the captured data to be stored in the data management system 121. The filter may comprise a query to identify the data to store. Other types of rules may also be included in the ETLS 122*a-c*. For example, each ETL may include a rule specifying a particular storage unit to store data for a particular source, client, application or analytics engine.

The ETLs 122*a-c* may also include protocols for communicating with the data sources 110*a-n* if needed. For example, different data sources may use different web services to communicate with other systems. An ETL may include the protocol or protocols to communicate with certain data sources.

The data storage system 130 stores data from the data sources 110*a-n* and provides the data to other systems, such as the analytics engine system 140 and the applications 171. In one embodiment, the data storage system 130 stores data in storage units. Each storage unit or a group of storage units may be for a particular client, a particular application and/or a particular analytics engine. Storage units 131*a-d* are shown in FIG. 1. The storage units 131*a-d* may segregate data as further described below. The number of storage units may vary. For the load aspect, the ETLs 122*a-c* may include rules that indicate what data is to be stored in each storage unit. In one example, a storage unit may be a database instance. For example, each storage unit is a database instance, and each database instance may have the same tables but is populated with the data for its respective client or application. For example, a database instance for client 180*a* only has data for that client.

The analytics engine system 140 performs analytics on data received from the data storage system 130. The analytics engine system 140 may comprise multiple analytics engines 141*a-f*. An analytics engine may comprise software performing particular analytics. The analytics may comprise descriptive or prescriptive analytics. The analytics may use conventional modeling to perform their functions, such as multivariate regression modeling. Off-the-shelf analytics engines may be used for the analytics engines 141*a-f*. The analytics engines 141*a-f* may be for different applications of the applications 171.

AE interfaces 142*a-f* are interfaces for the analytics engines 141*a-f*. The AE interfaces 142*a-f* comprise software to retrieve data from a particular storage unit and also to provide the output from the analytics engines 141*a-f* to their respective application. The AE interfaces 142*a-f* may comprise application programming interfaces (APIs) that include specifications to communicate with the data storage system 130 and the storage units 131*a-d*. The APIs may also include specifications for communicating with the applications 171.

The output of the analytics may be used by one or more of the applications 171 in the applications interface and storage system 170. The applications 171 are software applications and may provide descriptive and/or predictive analytic solutions to the clients 180*a-n* based on the analytics performed by the analytics engines 141*a-f*. The applications interface and storage system 170 may include an interface that allows the clients 180*a-n* to access one or more of the applications 171. For example, the interface may include a web interface that allows the clients 180*a-n* to access the applications 171 via the Internet. The clients 180*a-n* may need to register by providing client profile information in order to access the applications 171. Furthermore, one or more of the applications 171 may not be accessible by all of the clients 180a-n. For example, a client may be required to meet certain criteria or pay fees to access an application. The applications interface and storage system 170 may store client profile data, which may be used to determine whether a client can access an application.

The applications 171 may be client-specific, private and/or public. Other types of applications may also be used. A client-specific application is an application developed for the specific needs of a client. For example, a client specifies a problem or a need to a service provider. The service provider develops an application that provides a solution to the client's needs or problem and stores the application in the applications interface and storage system 170. A private application and a public application may be developed for one or more clients. The private application, however, may not be available to all clients. For example, an application owner, which may be a service provider, may require a client to be registered with the service provider and pay certain fees to access and use the private application. A public application may be available to any of the clients. However, an owner of a public application may require a client to pay for use of the public application.

The applications 171 may use data from one or more of the data sources 110a-n provided via the data management system 121. In one embodiment, the data storage system 130 identifies data based on the needs of the applications 171. For example, an application uses location data for new homes to predict service needs for new home buyers in various locations. The data storage system 130 identifies new homes data from one of more of the data sources 110a-n and stores the data so it can be sent to the analytics engine 140 and/or the application using the data. The data storage system 130 may store a query for new homes data and associate the query with the application. The query is executed on the data provided by the data sources 110a-n, and the results of the query may be stored and associated with the application using the new homes data. The results of the query may be provided to the analytics engine 140 and/or the application. Queries may be stored for one or more of the applications 171, so the applications 171 can utilize the relevant data from the data sources 110a-n to generate meaningful information for the clients 180a-n. Also, a user, which may be an application developer, client, administrator, or another entity, may be able to access the data management system 121 to select data sets to be sent to the analytics engines. This may also include setting filters to identify the most relevant data for an application.

The data storage system 130 may categorize data from the data sources 110a-n based on predetermined categories. An application associated with a category may use the information identified by the data storage system 130 for the category to perform its functions.

As described above, the analytics engines 141a-f performs analytics on data received from the data storage system 130. The analytics may include creating models from the received data and performing analysis of the data using the models. Examples of the analytics may include segmentation, statistical analysis, forecasting/extrapolation, predictive modeling, optimization and text mining. Segmentation is a method of optimizing performance by determining a specific audience for a business solution and customizing the business solution with the specific audience in mind. The descriptive and/or predictive analytic solutions may be customized for different audiences or populations. Statistical analysis includes summarizing and presenting data, estimation, confidence intervals, hypothesis testing, etc. Forecasting is the process of making statements about events whose actual outcomes have not yet been observed. Extrapolation is the process of constructing new data points outside of a discrete set of known data points. Predictive modeling is a process of creating or choosing a model to predict the probability of an outcome. Optimization is the improvement of a process, product, business solution, etc. Text mining is the process of deriving high-quality information from text.

Also, the analytics may use different engines for different types of data. For example, the analytic engine 141a may include a semantic analytics engine that determines semantic variables from online data gathered by one or more of the data source providers. The semantic variables determined by the semantic analytic engine 141a may indicate customer sentiment for a product, such as positive, negative, and neutral. An application may use the variables to identify to the client whether action should be taken with regard to customer sentiment for the product. Another example may include an analytics engine for sales forecasting. A sales forecasting analytics engine may consider data from the data sources 110a-n related to past sales performance, current sales data from clients and other sources, macroeconomic factors and other data that may impact sales. The sales forecasting analytics engine may make sales predictions, such as estimate growth or increase in sales volume, which may be used by an application to determine additional information.

Some examples of the applications 171 are now described. One example of an application may include a work force planning (WFP) application which estimates the workforce needed for a business. The WFP application may need to determine estimated sales volume to estimate the number of sales associates needed. The analytics engine 141a may include a sales forecasting analytics engine estimating sales volume based on data from one or more of the data sources 110a-n. The WFP application uses estimated sales volume to estimate work force needed for a future time period, which may include an increase or decrease in current workforce. The WFP application may connect to the client's enterprise system to perform activities. For example, the analytics engine 141a estimates a 50% sales increase for the eastern region. The WFP application can connect to the enterprise system and identify a sales manager for the eastern region from a contact resource management database. The WFP application sends an instruction to increase hiring by a certain percentage based on the forecasted sales increase.

Another example of the applications 171 may be a home security sales application. The home security sales application may be used to identify target areas for home security sales based on home sales data provided by one or more of the data sources 110a-n. The analytics engine 141a may be used to segment home sales data or forecast home sales, and this information may be used by the home security sales application to identify target areas.

Applications may be non-sales related. For example, an application may be used to predict weather or traffic based on data provided by one or more of the data sources 110a-n. Also, an application may be interactive. For example, a client may enter a zip code into an application to get reports on crime in the area. Another application may allow a client to visualize consumer spending across geographies, segments, and product categories based on data from one or more of the data sources 110a-n. Another application may allow a client to select a product category (e.g., printers, TVs, etc.) to investigate further in order to understand what is driving the spending patterns. For example, consumer product UPC codes are determined and used to identify product reviews. Sentiment analytics are performed, and the application generates reports visualizing consumer product sentiments. Many other types of applications may be stored in the applications interface and storage system 170.

In another example, an application and an analytics engine may be interactive. For example, the application may be a marketing application for targeting promotions. The analytics engine determines from data received from the data storage system 130 that a particular demographic of individuals may be receptive to a product promotion in a particular geographic location, such as one or more zip codes. The application may send a promotion for the product to individuals within the demographic and geographic location, and the application may receive other statistics, such as whether the promotion was accessed or used and where it was used. This data may be provided from the application to the analytics engine as feedback. The analytics engine may use this information and other information from the data storage system 130 to perform additional analytics and send that information to the application. For example, the analytics engine may identify that text messaging is the best medium to provide the promotion to users. Then, the application may use this information to further optimize or target promotions. This process may be periodically repeated.

Many components of the system 100 may comprise software modules comprised of machine readable instructions. For example, the data management system 121 may comprise software modules performing the functions of the ETLs 122a-c, data management functions and other functions of the data management system. The analytics engines, the AE interfaces and the applications 171 also comprise software.

Figure 2:
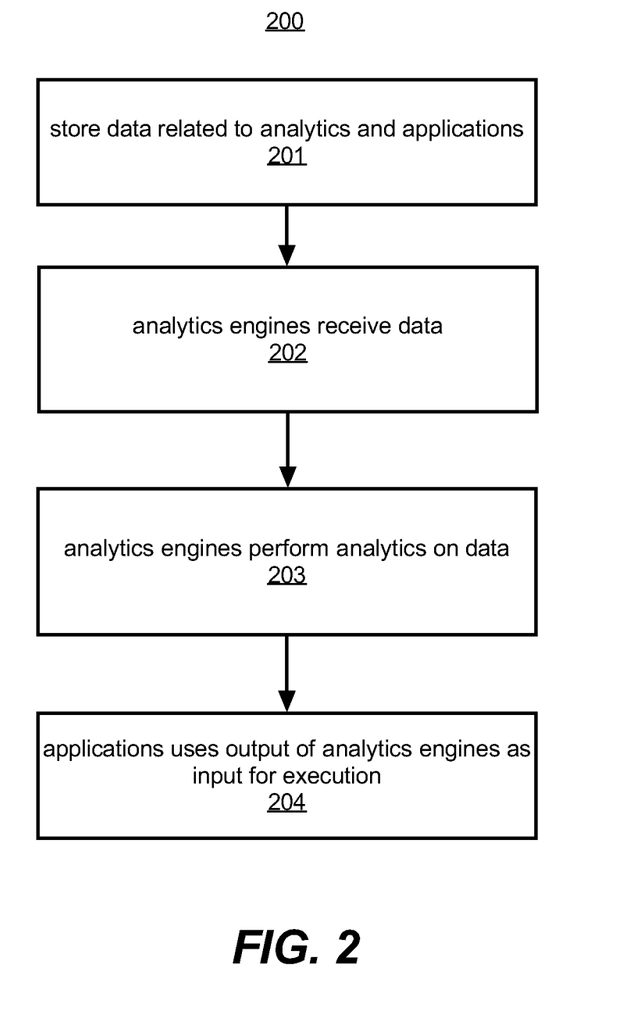
FIGS. 2 and 3 illustrate data flow diagrams, according to embodiments.

FIG. 2 shows a flowchart of a method 200, according to an embodiment. The method 200 is described with respect to the system 100 shown in FIG. 1 by way of example. The method 200 may be practiced in other systems.

At step 201, the data management system 121 stores data for the analytics engines 141a-f and the applications 170. In one embodiment, the data may be related to a category associated with one or more of the applications 171. For example, the category is weather for a weather forecasting application of the applications 171. The ETL 122a stores weather data in the storage unit 131a from various data sources according to the rules stored in the ETL 122a. The data stored for the category may be periodically updated as new data is received from the data sources 110a-n. Rather than storing data for a broad category, the ETL 122a may be programmed to store more specific data in a storage unit. For example, the ETL 122a may include rules to store data related to tornado forecasts or weather conditions that may be indicative of a tornado and geographic locations along with the conditions. The rules may specify to store the data in the storage unit 131a. The analytics engine 142a includes a model for predicting whether a tornado may occur based on the conditions. The predictions are provided to an application which provides reporting to users and other systems that may be relevant to the particular geographic location for the condition and prediction.

At step 202, the analytics engines 141a-f receive the data from the data management system 121. For example, the AE interface 142a is programmed to retrieve the tornado weather condition data from the storage unit 131a and provides the data to the analytics engine 142a.

At step 203, the analytics engines 142a-f perform analytics on the data. For example, the analytics engine 142a makes predictions on whether a tornado may occur based on the weather conditions.

At step 204, the applications 171 use data output from the analytics engines 141a-f as input for execution of their functions. For example, the output of the analytics engine 142a includes predictions on whether a tornado may occur based on the weather conditions and geographic locations where the tornadoes may occur. An application may use this information to generate alerts to systems and emergency personnel in the geographic locations. A client of the clients 180a-n may selectively execute an application of the applications 171. In one example, one or more of the applications are available on-demand or through a subscription service. Thus, a client may selectively invoke applications as needed.

Figure 3:
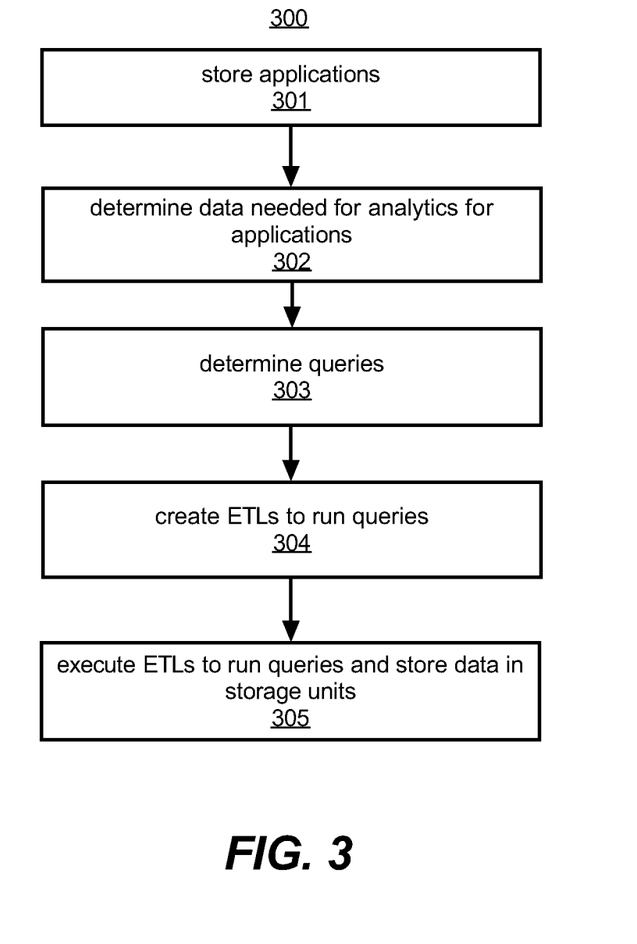

FIG. 3 illustrates a method 300, according to an embodiment. The method 300 is described with respect to the system 100 shown in FIG. 1 by way of example. The method 300 may be practiced in other systems. The method 300 is similar to the method 200, however, the method 300 describes an embodiment whereby queries are generated and used to retrieve desired data from the data sources for performing analytics and running the applications 171.

At step 301, the applications 171 are generated and stored in the applications interface storage 170.

At step 302, data needed for analytics associated with the applications 171 are determined. For example, the data may be categories of data, such as data related to sales of a product.

At step 303, queries are determined that identify the categories of data to be retrieved from the data sources. The queries may be generated by users. In one example, a query is generated to target specific data for analytics. For example, the query may include determine sales data for a particular geographic region for a particular time period.

At step 304, ETLs are created to run the queries on data from the data sources. For example, the ETL 122b may receive data from one or more of the data sources and run a query on the data from the data sources.

At 305, the ETLs are executed to run the queries and store the data in the storage units. Then, analytics are performed on the data and provided to the applications 171 such as described above with respect to steps 203 and 204. For example, the ETL 122b may communicate with the data sources to receive the data. The ETL 122b may store the data for the categories in corresponding storage units.

Figure 4:
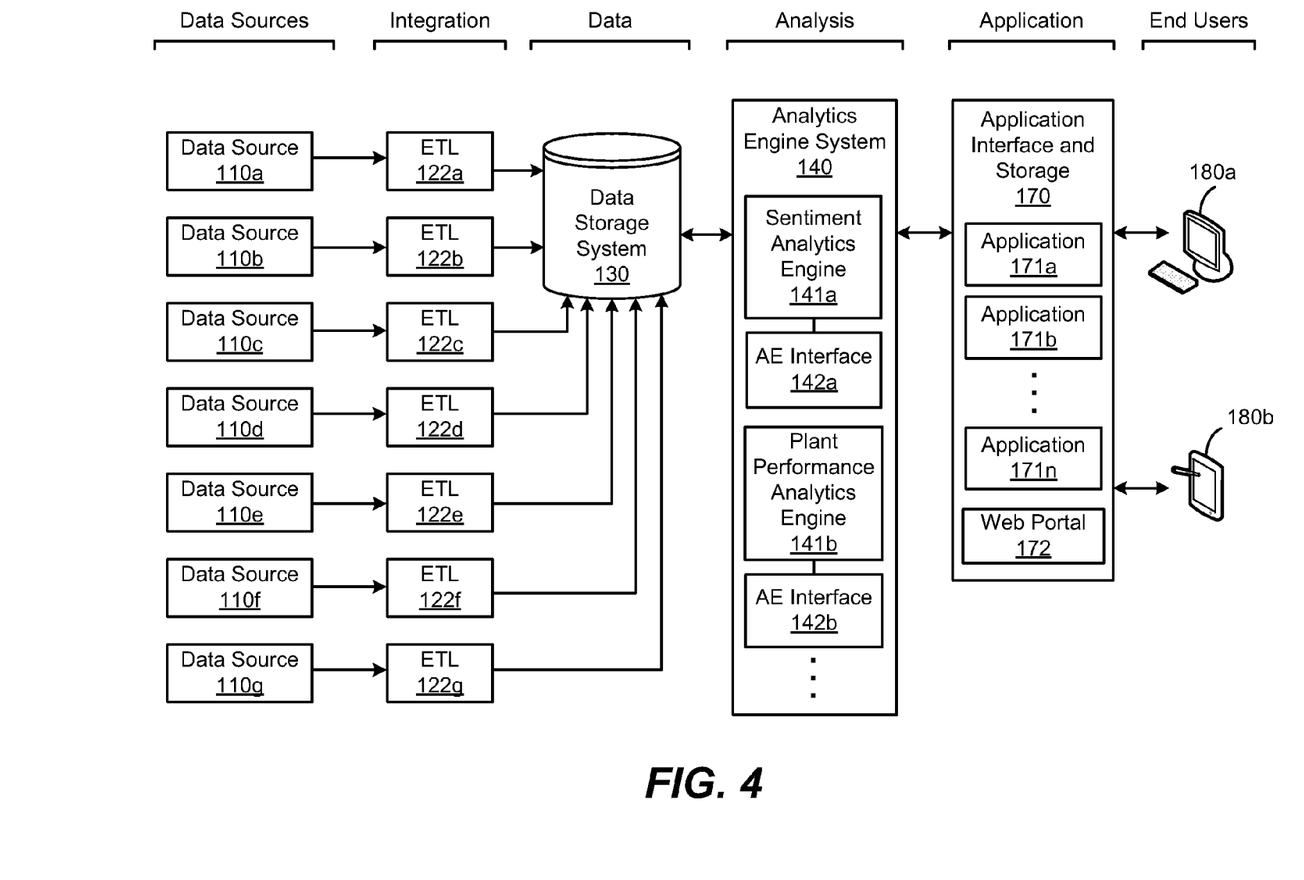
FIG. 4 illustrates a system diagram, according to an embodiment.

FIG. 4 shows examples of components of the system 100. For example, the system may include an analytics engine and application used to determine the impact of social media applications on sales of a product. Social media applications may include web-based technologies that use the Internet to publish user generated content. A social media application may use web-based technology for social interaction. The data sources may include public data that is available on the Internet, such as product reviews or blogs 110a and other data sets 110b. The data sources may include private data 110c which may be provided by the client. $3^{rd}$ party data 110d may include data provided by commercial databases. ETLs 112a-c integrate the data into the data storage system 130. The integration may include translation, filtering, querying, etc, such as described above. Integration may include storing the data in predetermined storage units, not shown. The analytics engine system 140 may include sentiment analytics engine 141a and AE interface 142a. The AE interface 142a retrieves data from the data storage system 130 for processing by the sentiment analytics engine 141a. The data may be retrieved from the predetermined storage units. The sentiment analytics engine 141a may include a model comprised of social media variables that are used to estimate the impact of social media applications on sales or other marketing objectives. The sentiment analytics engine 141*a* may forecast or estimate sales based on a set of inputs comprised of data from the data sources. The sales estimates may be provided to the application 171*a*. The application 171*a* may identify optimal investments in various marketing channels based on the forecasting to maximize sales. End user 180*a* may interact with the application 171*a* through web portal 172 to determine the optimal investments in the marketing channels.

FIG. 4 also shows an example of components of the system 100 that may be used to optimize power plant performance. For example, the data sources may include public data 110*e*, such as energy costs. The data sources may include private data 110*f*, such as data captured from sensors and maintenance logs in power plants owned by a utility. The data sources may include $3^{rd}$ party data 110*g*, such as maintenance schedules provided by parts manufacturers. ETLs 112*d-f* integrate the data into the data storage system 130. The integration may include translation, filtering, querying, etc, such as described above. Integration may include storing the data in predetermined storage units.

The analytics engine system 140 may include plant performance analytics engine 141*b* and AE interface 142*b*. The AE interface 142*b* retrieves data from the data storage system 130 for processing by the plant performance analytics engine 141*b*. The data may be retrieved from the predetermined storage units. The plant performance analytics engine 141*a* forecasts plant metrics to identify days for performing plant maintenance. For example, the plant performance analytics engine 141*a* forecasts energy usage for future time periods and low energy usage time periods may then be used for performing scheduled maintenance. Another forecasted plant metric may be associated with energy costs, e.g., cost per kilowatt hour. Maintenance may be scheduled when energy costs are the least. The application 171*b* may be a plant performance application that schedules maintenance for the power plant. The application 171*b* may use the low energy usage days or time periods identified by the plant performance analytics engine 141*b* to schedule maintenance. User 180*b* may be a plant manager that accesses the application 171*b* via the web portal to facilitate the scheduled maintenance.

The plant performance analytics engine 141*b* may estimate when maintenance is due based on the data from the data sources. For example, manufacturer data may indicate that a fan needs to be replaced every 7 years if oiled yearly. The plant performance analytics engine 141*b* determines that the fan has been oiled every two years. Based on data from other plants and the manufacturer data, the plant performance analytics engine 141*b* estimates the fan may fail prematurely. The application 171*b* provides an alert to the user 180*b* to indicate when to change the fan.

Figure 5:
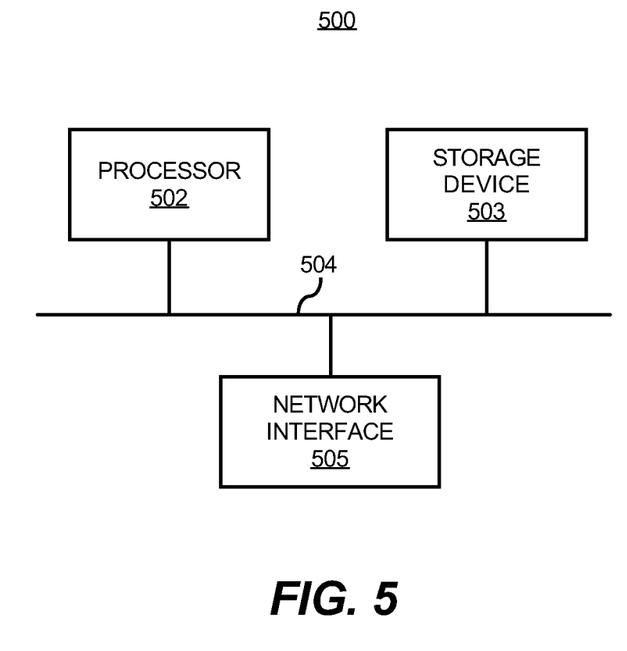
FIG. 5 illustrates a computer system, according to an embodiment.

FIG. 5 shows a computer system 500 that may be used as a hardware platform for the system 100. The computer system 500 may be used as a platform for executing one or more of the steps, methods, and functions described herein that may be embodied as software stored on one or more computer readable storage devices, which are hardware storage devices. In an embodiment, the data management system 121, the analytics engine system 140 and the applications interface and storage system 170 are run on different computing platforms, and each platform may include the components of the computer system 500. Each platform may include a server. The system 100 may be run on a distributed computing system, such as a cloud computing system.

The computer system 500 includes a processor 502 comprising processing circuitry that may implement or execute software instructions performing some or all of the methods, functions and other steps described herein. Commands and data from the processor 502 are communicated over a communication bus 504. The computer system 500 also includes a non-transitory computer readable storage device 503, such as random access memory (RAM), where the software and data for processor 502 may reside during runtime. The storage device 503 may also include non-volatile data storage. The computer system 500 may include a network interface 505 for connecting to a network. It will be apparent to one of ordinary skill in the art that other known electronic components may be added or substituted in the computer system 500.

While the embodiments have been described with reference to examples, those skilled in the art will be able to make various modifications to the described embodiments without departing from the scope of the claimed embodiments.

What is claimed is:

1. A digital analytics system comprising:
   a data management system including data extraction modules and a data storage system comprising storage units;
   an analytics engine system hosting and executing a plurality of analytics engines, each associated with a different application,
      wherein each of the data extraction modules and each of the storage units are assigned to a particular one of the analytics engines and the associated application for the analytics engine, and each of the data extraction modules extracts data from at least one data source and stores the data in the storage unit for the analytics engine or the associated application assigned to the data extraction module, and the storage unit segregates the stored data from data stored in any of the other storage units, and
      each of the data extraction modules includes translation rules for the assigned analytics engine and the associated application, the translation rules including instructions to re-format and filter the data from the at least one data source prior to storing the data in the storage unit, and
      to filter the data, the data extraction module receives, from the assigned analytics engine or the associated application, a query for a data set conforming to constraints in the query, runs the query on data from the at least one data source to identify query results from the data, prior to storing the query results in the corresponding storage unit, re-formats the query results according to the translation rules, and stores the re-formatted, query results in the corresponding storage unit,
      wherein the plurality of analytics engines include:
         a workforce planning (WFP) analytics engine associated with a WFP application, and an interface for the WFP analytics engine, wherein the interface retrieves sales data from the storage unit for the WFP analytics engine and provides the sales data to the WFP analytics engine, and the WFP analytics engine estimates sales for a future time period based on the sales data, and the WFP application uses the sales estimates to estimate a needed increase or decrease in workforce and interacts with a system of a client to identify and contact a user to provide an indication of the needed increase or decrease in workforce; and
         a utility plant performance analytics engine, an interface for the utility plant performance analytics engine, and a utility plant performance application, wherein the interface for the utility plant performance analytics engine retrieves data from a predetermined storage unit and provides the data to the utility plant performance analytics engine, the utility plant performance analytics engine estimates a utility plant metric for a future time period based on the data, and the utility plant performance application uses the estimated metric to schedule maintenance for the utility plant, wherein the data comprises maintenance logs for the utility plant, manufacturers' recommended maintenance instructions, and maintenance logs for other utility plants, and the utility plant performance analytics engine estimates when maintenance is due for the utility plant based on the data, and the utility plant performance application provides notification to the client of the estimates for maintenance; and an applications interface and storage storing the applications, wherein the applications are executed using information generated by at least one of prescriptive and descriptive analytics performed by the analytics engines, wherein the data extraction modules further include business intelligence rules including a list of prioritized data sources, wherein the data extraction modules are to determine whether same or similar data is available from multiple data sources, and in response to determining that the same or similar data is available from multiple data sources, the data extraction modules are to use the prioritized list of data sources to accept data from a plurality of the data sources in an order specified in the prioritized list.

2. The digital analytics system of claim 1, wherein the translations rules specify a new data type for re-formatting the data for storage in the storage units.

3. The digital analytics system of claim 1, wherein the translations rules specify a new schema including different data fields for re-formatting the data for storage in the storage units.

4. The digital analytics system of claim 1, wherein each of the extraction modules comprise rules for identifying the storage unit assigned to the same analytics engine to store the data extracted from the at least one data source.

5. The digital analytics system of claim 1, wherein the applications interface and storage includes a web interface that allows clients to access and execute the applications.

6. The digital analytics system of claim 1, wherein the data management system runs on a computing platform different than a computing platform hosting the analytics engine system or the applications interface and storage.

7. The digital analytics system of claim 1, wherein the data sources comprise private data sources, public data sources and data from clients accessing the applications.

8. The digital analytics system of claim 1, wherein the interface for each analytics engine stores metadata identifying a particular storage unit of the storage units to retrieve data for the analytics engine.

9. The digital analytics system of claim 1, wherein the storage units segregate the stored data according to the application or client that is to use the data.

10. A data management system comprising:
data extraction modules executed by at least one processor; and a data storage system comprising storage units, wherein the data extraction modules are to extract data from data sources and store the data in the storage units, wherein each of the data extraction modules and each of the storage units are assigned to a particular one of a plurality of analytics engines and an associated application for each analytics engine, and each of the data extraction modules extracts data from at least one of the data sources and stores the data in the storage unit for the analytics engine and the associated application assigned to the data extraction module, and the storage unit segregates the stored data from data stored in any of the other storage units, and each of the data extraction modules includes translation rules for the assigned analytics engine and the associated application, the translation rules including instructions to re-format and filter the data from the at least one data source prior to storing the data in the storage unit, and to filter the data, the data extraction module receives, from the assigned analytics engine or the associated application, a query for a data set conforming to constraints in the query, runs the query on data from the at least one data source to identify query results from the data, prior to storing the query results in the corresponding storage unit, re-formats the query results according to the translation rules, and stores the re-formatted, query results in the corresponding storage unit, wherein the re-formatting includes formatting the data for storage in the corresponding storage unit according to a new schema including different fields from the at least one data source, and wherein the data extraction modules are to determine whether same or similar data is available from more than one of the data sources, and in response to determining that the same or similar data is available from more than one of the data sources, the data extraction modules are to use the prioritized list to accept data from a plurality of the data sources in an order specified in the prioritized list, wherein the plurality of analytics engines includes a utility plant performance analytics engine, an interface for the utility plant performance analytics engine, and a utility plant performance application, wherein the interface for the utility plant performance analytics engine retrieves data from a predetermined storage unit and provides the data to the utility plant performance analytics engine, the utility plant performance analytics engine estimates a utility plant metric for a future time period based on the data, and the utility plant performance application uses the estimated metric to schedule maintenance for the utility plant, and wherein the data comprises maintenance logs for the utility plant, manufacturers' recommended maintenance instructions, and maintenance logs for other utility plants, and the utility plant performance analytics engine estimates when maintenance is due for the utility plant based on the data, and the utility plant performance application provides notification to the client of the estimates for maintenance.

11. The data management system of claim 10, wherein the data storage system is to communicate with interfaces for the plurality of analytics engines hosted at an analytics engine system and provide data from the storage units to the analytics engines via the interfaces, and the analytics engines perform at least one of prescriptive and descriptive analytics using the data.

12. A method of extracting data from a plurality of data sources by data extraction modules and performing analytics by analytics engines on data captured from the plurality of data sources and using the analytics to invoke application processing by applications associated with the analytics engines, the method comprising:
assigning each of the data extraction modules to a particular one of the analytics engines and an associated application for the analytics engine;
assigning each of a plurality of storage units to a particular one of the analytics engines and an associated application, wherein data stored in a storage unit is segregated from data store in any of the other plurality of storage units;
extracting, by each of the data extraction modules executed by a processor, data from at least one of the plurality of data sources;
storing the data in the storage unit for the analytics engine and the associated application assigned to the data extraction module;
modifying, by each of the data extraction modules, the data according to translation intelligence rules, wherein the modifying includes re-formatting and filtering the data from the data sources prior to storing the data in the storage units in accordance with the translation intelligence rules, and the filtering includes:
receiving, from the assigned analytics engine or the associated application, a query for a data set conforming to constraints in the query;
running the query on data from the at least one data source to identify query results from the data; and
prior to storing the query results in the corresponding storage unit, re-formatting the query results according to the translation rules;
storing, by each of the data extraction modules, the modified data, including the re-formatted query results, in the corresponding storage unit;
retrieving data relevant to analytics engines from the storage units; and
executing the analytics engines to perform the analytics on the retrieved data, wherein the analytics engines comprise a utility plant performance analytics engine, an interface for the utility plant performance analytics engine, and a utility plant performance application, wherein the interface retrieves data from a predetermined storage unit and provides the data to the utility plant performance analytics engine, the utility plant performance analytics engine estimates a utility plant metric for a future time period based on the data, and the utility plant performance application uses the estimated metric to schedule maintenance for the utility plant,
wherein the data comprises maintenance logs for the utility plant, manufacturers' recommended maintenance instructions, and maintenance logs for other utility plants, and the utility plant performance analytics engine estimates when maintenance is due for the utility plant based on the data, and the utility plant performance application provides notification to the client of the estimates for maintenance, and
wherein extracting the data includes determining whether same or similar data is available from more than one of the plurality of data sources, and
in response to determining that the same or similar data is available from more than one of the plurality of data sources, receiving the data from at least some of the plurality of data sources according to an order of the plurality of data sources specified in a prioritized list of the plurality of data sources.

13. The method of claim 12, wherein the translations rules specify a new data type for re-formatting the data for storage in the storage units, and the translations rules specify a new schema including different data fields for re-formatting the data for storage in the storage units, and the business intelligence rules identifying a particular storage unit of the storage units to store the data.

14. The method of claim 12, wherein retrieving data relevant to the analytics engines from the storage units comprises:
for each analytics engine, storing metadata at an interface, wherein the metadata identifies the storage unit assigned to the analytics engine to retrieve data for the analytics engine;
using the metadata to identify the storage unit assigned to the analytics engine; and
retrieving, by the interface, the data relevant to the analytics engine from the identified storage unit.

* * * * *